(12) United States Patent
Oberle

(10) Patent No.: US 6,386,527 B2
(45) Date of Patent: May 14, 2002

(54) PNEUMATICALLY-CONTROLLED HYDRAULIC ANTIVIBRATION SUPPORT, AND A MOTOR VEHICLE INCLUDING SUCH A SUPPORT

(75) Inventor: Alexandre Oberle, Chateaudun (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 09/906,297

(22) Filed: Jul. 16, 2001

(30) Foreign Application Priority Data

Jul. 27, 2000 (FR) .......................... 00 09858

(51) Int. Cl.⁷ .................................. F16F 5/00
(52) U.S. Cl. ...................... 267/140.14; 257/140.13
(58) Field of Search ............... 267/140.11, 140.13, 267/140.14, 140.15, 219; 248/550, 562, 566, 636, 638

(56) References Cited

U.S. PATENT DOCUMENTS

| | | | |
|---|---|---|---|
| 5,393,041 A | * 2/1995 | Takano et al. | 267/140.14 |
| 5,427,361 A | * 6/1995 | Suzuki et al. | 267/140.12 |
| 5,620,168 A | * 4/1997 | Ohtake et al. | 267/140.13 |
| 5,632,472 A | * 5/1997 | Kato et al. | 267/140.13 |
| 5,769,402 A | * 6/1998 | Ide et al. | 267/140.14 |
| 6,176,477 B1 | * 1/2001 | Takeo et al. | 267/140.11 |
| 6,199,842 B1 | 3/2001 | Gennesseux et al. | |
| 6,264,181 B1 | * 7/2001 | Muramatsu et al. | 267/140.14 |
| 6,311,964 B1 | * 11/2001 | Suzuki | 267/140.13 |

FOREIGN PATENT DOCUMENTS

| | | |
|---|---|---|
| EP | 0 440 260 | 8/1991 |
| FR | 2 782 764 | 3/2000 |

OTHER PUBLICATIONS

Search Report issued by the French Patent Office for parent French Application No. 0009858 filed on Jul. 27, 2000; report dated Mar. 27, 2001.

* cited by examiner

Primary Examiner—Christopher P. Schwartz
(74) Attorney, Agent, or Firm—Marshall, Gerstein, & Borun.

(57) ABSTRACT

A hydraulic antivibration support comprising two strength members interconnected by an elastomer body which defines a liquid-filled hydraulic working chamber, which chamber communicates via two passages with first and second compensation chambers defined by two juxtaposed bags formed in a common flexible elastomer wall. The second compensation chamber is surrounded by a rigid thimble which presses the flexible wall against an off-center portion of a rigid partition in order to separate the two compensation chambers.

8 Claims, 2 Drawing Sheets

PNEUMATICALLY-CONTROLLED HYDRAULIC ANTIVIBRATION SUPPORT, AND A MOTOR VEHICLE INCLUDING SUCH A SUPPORT

FIELD OF THE INVENTION

The present invention relates to pneumatically-controlled hydraulic antivibration supports and to antivibration systems including such supports.

More particularly, the invention relates to a hydraulic antivibration support for interposing between two rigid elements and comprising:

first and second rigid strength members for fixing to the two rigid elements that are to be united;

an elastomer body interconnecting the two strength members and defining part of a liquid-filled working chamber, said elastomer body being adapted to support a static load directed along a central axis;

a flexible elastomer wall forming two adjacent bags which define respectively a compensation chamber and an additional hydraulic chamber, both filled with liquid and connected to the working chamber respectively via a constricted first passage and via a second passage;

a rigid partition extending perpendicularly to the central axis and secured to the second strength member, said rigid partition separating the working chamber from the compensation chamber and from the additional hydraulic chamber;

a rigid protective cup covering the flexible wall and encompassing both the compensation chamber and the additional hydraulic chamber, said protective cup having an end wall and a peripheral side wall fixed to the second strength member; and a rigid thimble which has an annular side wall extending in the direction of the central axis between a closed end wall and an open end, said thimble being pressed against the flexible wall and clamping said flexible wall in leakproof manner against the rigid partition around the second bag formed in said flexible wall so as to separate the compensation chamber from the additional hydraulic chamber, and said thimble presenting an inside surface which co-operates with said second bag to define a pneumatic chamber communicating with a pneumatic duct.

BACKGROUND OF THE INVENTION

Document FR-A-2 782 764 describes an example of such an antivibration support, which gives entire satisfaction, particularly concerning attenuation of vibration at the idling frequency of an engine mounted in vehicle bodywork by means of the antivibration support.

OBJECTS AND SUMMARY OF THE INVENTION

Nevertheless, it can be desirable to further improve antivibration supports of this type, in particular to facilitate deformation of the first bag of the flexible wall. In addition, the second bag of the flexible wall of that known support is itself quite rigid and designed specifically to enter into vibration under the effect of alternating pressure rises and falls generated in the pneumatic chamber, but it would be desirable for this second bag to be made more flexible so that it can deform freely solely under the effect of variations in the volume of the working chamber, in particular when the engine is idling if the antivibration support is supporting an engine, so as to avoid the need to control the displacements of said second bag in positive manner.

A particular object of the present invention is to resolve these technical problems.

To this end, the invention provides an antivibration support of the kind in question which is characterized:

in that the additional hydraulic chamber is adjacent to the side wall of the protective cup;

in that the compensation chamber is juxtaposed to said additional hydraulic chamber without surrounding said additional hydraulic chamber, said compensation chamber being in contact with the rigid partition via a first surface area that is more than four times greater than a second surface area of said rigid partition which is in contact with the additional hydraulic chamber; and in that the thimble extends parallel to the central axis to the end wall of the protective cup, the second bag of the flexible wall extending at rest to the vicinity of the end wall of said thimble.

By means of these dispositions:

the compensation chamber is easily deformable given its one-piece shape and its large volume; and the additional hydraulic chamber is itself easily deformable, where appropriate solely under the effect of variations in the volume of the working chamber, thus making it possible, where so desired, to avoid positively controlling the displacements of the second flexible bag.

In preferred embodiments of the invention, it is also possible to make use of one or more of the following dispositions:

the rigid partition has a central portion provided with a decoupling valve member formed by a flexible elastomer membrane which separates the working chamber from the compensation chamber and which is adapted to vibrate within limited clearance between these two chambers, the second passage being disposed radially outside said decoupling valve member, and the compensation chamber being disposed substantially to correspond with the decoupling valve member;

the rigid partition has two grids communicating respectively with the working chamber and with the compensation chamber to limit the clearance for the decoupling valve member, the free end of the thimble being placed radially outside the grid which communicates with the compensation chamber, placing a solid portion of said rigid partition;

the second passage is a constricted passage, said first and second throttle passages being dimensioned to present different first and second resonant frequencies respectively, the first resonant frequency being less than 20 hertz (Hz) and the second resonant frequency lying in the range 20 Hz to 80 Hz;

the flexible elastomer wall has a peripheral edge which is clamped in leakproof manner between the side wall of the protective cup and the rigid partition, the open end of the side wall of the thimble being shaped substantially as a circular segment and presenting firstly a curved portion running along the side wall of the protective cup, and secondly a substantially rectilinear portion between the compensation chamber and the additional hydraulic chamber; and the second passage extends substantially parallel to the central axis.

The invention also provides a motor vehicle comprising:

bodywork supporting an engine via at least one hydraulic antivibration support as defined above;

a three-port valve mounted in the vehicle independently of the antivibration support and adapted to make the pneumatic chamber of the antivibration support communicate either with the atmosphere or with a source of suction; and a control device mounted in the vehicle independently of the antivibration support and adapted to actuate the three-port valve so as to make the pneumatic chamber of the antivibration support communicate with the atmosphere when the engine of the vehicle is operating at a speed below a predetermined limit, and so as to make the pneumatic chamber of the antivibration support communicate with the source of suction when the vehicle engine is operating at a speed greater than said predetermined limit.

In particular, said predetermined limit can correspond to an engine speed that generates vibration at a frequency that lies in the range 20 Hz to 100 Hz, and that is not less than said second resonant frequency.

BRIEF DESCRIPTION OF THE DRAWINGS

Other characteristics and advantages of the invention appear from the following description of an embodiment given by way of non-limiting example and with reference to the accompanying drawings.

In the drawings.

MORE DETAILED DESCRIPTION

In the various figures, the same references designate elements that are identical or similar.

Figure 1:
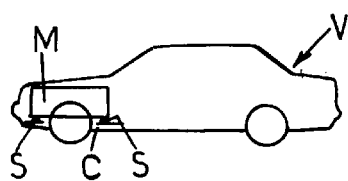
FIG. 1 is a diagrammatic view of a motor vehicle whose engine is carried on at least one hydraulic antivibration support constituting an embodiment of the invention.
Figure 2:
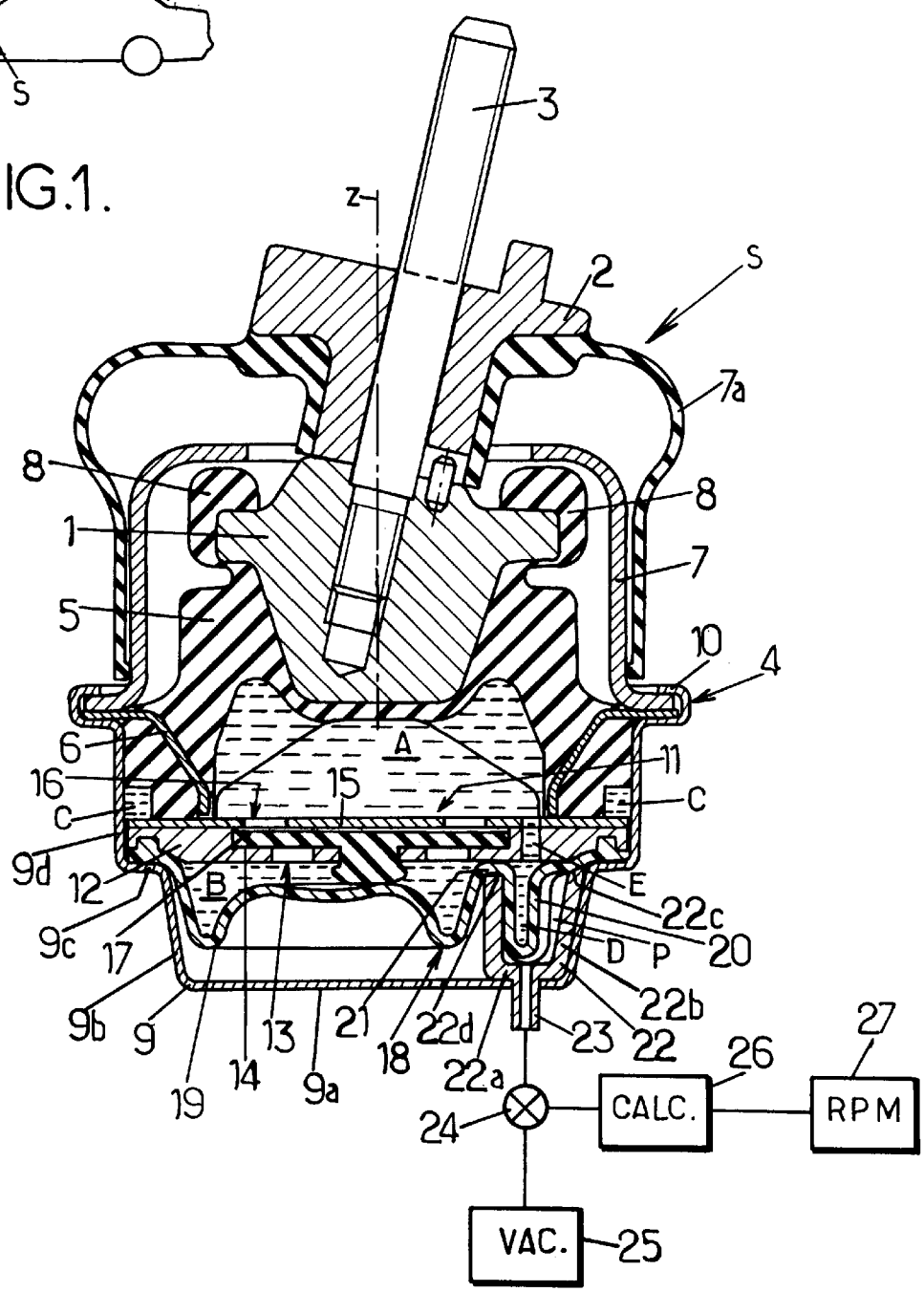
FIG. 2 is a vertical section view through the antivibration support of the FIG. 1 vehicle, in an operating state corresponding to the engine idling.

FIG. 1 shows a motor vehicle V whose bodywork C supports an engine M via at least one hydraulic antivibration support S of the kind shown in FIG. 2.

The antivibration support S comprises:

a first rigid strength member 1 in the form of a metal socket secured to an intermediate metal part 2 and a pin 3 which points upwards in a direction close to the vertical axis Z and which is designed to be fixed to the engine M of the vehicle, for example;

a second strength member 4 which is for fixing to the bodywork C of the vehicle, for example, and which includes in particular a metal ring 6; and an elastomer body 5 capable in particular of supporting the static forces due to the weight of the engine M, said elastomer body possibly being bell-shaped, for example, extending between a top which is overmolded and bonded onto the socket 1 and an annular base which is overmolded and bonded onto the metal ring 6.

In the example shown, a rigid metal bell 7 whose outline is secured to the ring 6 has a top opening through which the intermediate part 2 and the pin 3 project. This bell covers the elastomer body 5 and also the socket 1 so as to restrict relative movement between the first and second strength members 1 and 4 by means of an elastomer bead 8 formed around the socket 1 coming into abutment against the inside surface of the metal bell 7.

Furthermore, a flexible protective skirt 7a of elastomer is overmolded and bonded onto the intermediate part 2, with said skirt being engaged around the metal bell 7.

In addition, the support S also comprises a bottom protective cup 9 made of sheet metal. This cup has a horizontal bottom wall 9a which is extended upwards by a peripheral side wall comprising a frustoconical first portion 9b, followed by a substantially horizontal annular rim 9c, and then by a cylindrical portion 9d which is terminated in a crimped margin 10 which surrounds the respective peripheries of the metal ring 6 and of the metal bell 7 so that the cup 9, the ring 6 and the metal bell 7 together make up the above-mentioned second strength member 4.

This second strength member 4 is secured to a rigid partition 11 extending perpendicularly to the axis Z and clamped between the bottom of the elastomer body 5 and the rim 9c of the protective cup. This partition comprises a hollow shell 12, e.g. made as a light alloy casting, and in its central portion it includes a bottom grid 13 having a housing 14 hollowed out above it and covered by a sheet-metal plate 15 which also has a perforated grid 16 formed therein to correspond with the housing 14.

A decoupling valve member 17 in the form of a flexible elastomer membrane is mounted in the housing 14 with a small amount of clearance in the Z-axis direction, for example the clearance of the valve member 17 can be about 0.5 millimeters (mm) to 1 mm so as to enable the valve member 17 to vibrate freely parallel to the axis Z.

Figure 3:
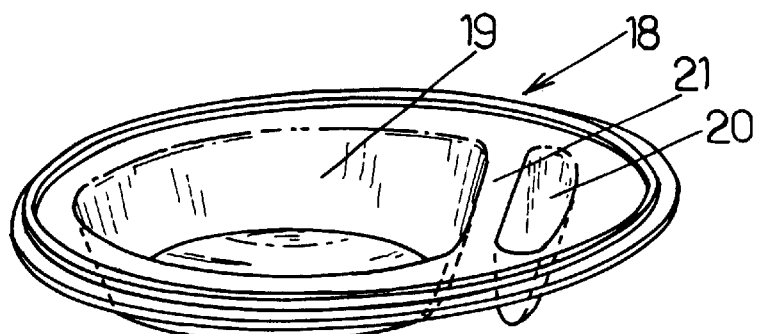
FIG. 3 is an exploded perspective view showing the flexible elastomer wall which defines the two compensation chambers of the antivibration support of FIG. 2, together with a thimble-shaped insert which encompasses one of its chambers.

Furthermore, the support S has a flexible elastomer wall 18 that also be seen in FIG. 3 and that forms two bags or bellows 19 and 20 which are juxtaposed facing the rigid partition 11, these bags 19 and 20 being separated from each other by a zone 21 of the flexible wall 18 which is pressed in leakproof manner against a solid portion of the rigid shell 12 placed radially outside the grid 13.

The bag 20 of the flexible wall 18 is surrounded by a rigid insert 22 in the form of a thimble, e.g. made of plastics material and presenting a horizontal bottom wall 22a placed against the bottom wall 9a of the protective cup and extended upwards by a side wall 22b which extends to an open annular end 22c, 22d. This open end of the thimble 22 is pressed against the bottom face of the flexible wall 18 around the second bag 20, clamping said flexible wall against solid portions of the rigid shell 12 so as to establish leakproof separation between the inside volumes of the bags 19 and 20.

Advantageously, the thimble 22 is placed against the frustoconical portion 9b of the side wall of the protective cup 9, and the open annular end of the thimble presents:

firstly a curved portion 22c which can be in the form of a circular arc, for example, and which runs adjacent to said frustoconical portion 9b of the cup 9; and secondly, a rectilinear portion 22d which faces the separation zone 21 in the flexible wall 18.

The antivibration support thus defines three liquid-filled hydraulic chambers, namely:

a working chamber A defined between the inside surface of the elastomer body 5 and the sheet metal plate 15 of the rigid partition 11;

a first compensation chamber B defined between the bottom face of the rigid shell 12 and the flexible bag 19, said first compensation chamber B communicating with the working chamber A via a constricted passage C which, in the example shown, is provided through the base of the elastomer body 5 and the rigid partition 11, said constricted passage C being dimensioned so as to present a resonant frequency of less than 20 Hz and generally close to 10 Hz; and a second compensation chamber D which is defined between the bottom face of the rigid shell 12 and the second bag 20 of the flexible elastomer wall, said second compensation chamber being in contact with the bottom face of the partition 11 via an area which is, for example, one-fourth to one-eighth the area of contact between the chamber B and the bottom face of the partition 11, said chamber D communicating with the working chamber A via a constricted passage E pierced parallel to the axis Z through the rigid partition 11 and dimensioned to present a resonant frequency advantageously lying in the range 20 Hz to 80 Hz, corresponding to the frequency of vibration as generated by the engine M when it is idling.

Furthermore, the top face of the valve member 17 communicates with the working chamber A while the compensation chamber B communicates with the bottom face of said valve member, which valve member forms a leakproof barrier between the two chambers, particularly when it is in its position in abutment against either one of the grids 13 and 16.

The one-piece configuration of the compensation chamber B enables the flexible bag 19 which defines said chamber to deform easily in order to absorb variations in the volume of the working chamber A.

The same applies to the compensation chamber D which advantageously occupies the full height of the thimble 22, and is thus of relatively large volume.

Finally, the thimble 22 co-operates with the outside surface of the flexible bag 20 to define a pneumatic chamber P which communicates with a coupling 23 formed through the bottom wall 22a of the thimble and passing through the bottom wall 9a of the protective cup. This coupling 23 in turn communicates via a duct with a three-port valve 24 which is adapted to put the pneumatic chamber P into communication either with the atmosphere or with a source of suction 25 (VAC.) e.g. constituted by a vacuum circuit used for assisting vehicle braking.

The three-port valve 24 can advantageously be constituted by a solenoid valve controlled by an electronic control circuit 26 (CALC.) such as the vehicle's on-board computer, which is in turn connected to a sensor 27 (RPM) supplying engine speed.

The valve 24 and the computer 26 are installed in the vehicle independently of the support S so that the support can be of relatively small dimensions and easy to integrate in the vehicle V.

Thus, when the vehicle engine is idling, i.e. when the sensor 27 indicates an engine speed below a predetermined limit, e.g. corresponding to vibrations at a frequency lying in the range 20 Hz to 100 Hz, the control circuit 26 actuates the valve 24 so as to put the pneumatic chamber P into communication with the atmosphere, as shown in FIG. 2.

In this mode of operation, vibration from the engine M is transmitted to the working chamber A via the elastomer body 5, thereby giving rise to fluctuations in the volume of said working chamber, which fluctuations are absorbed:

to a small extent by the decoupling valve member 17 oscillating between the two grids 13 and 16; and for the most part by deformation of the compensation chamber D: given the resonant frequency of the constricted passage E which corresponds substantially to the frequency of vibration delivered by the engine while idling, said constricted passage E is then the seat of resonance phenomena enabling engine vibration to be damped effectively.

Figure 4:
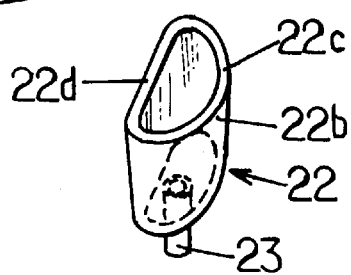
FIG. 4 is a view similar to FIG. 2 showing the antivibration support in its state correspond to the vehicle running.
Figure 4:
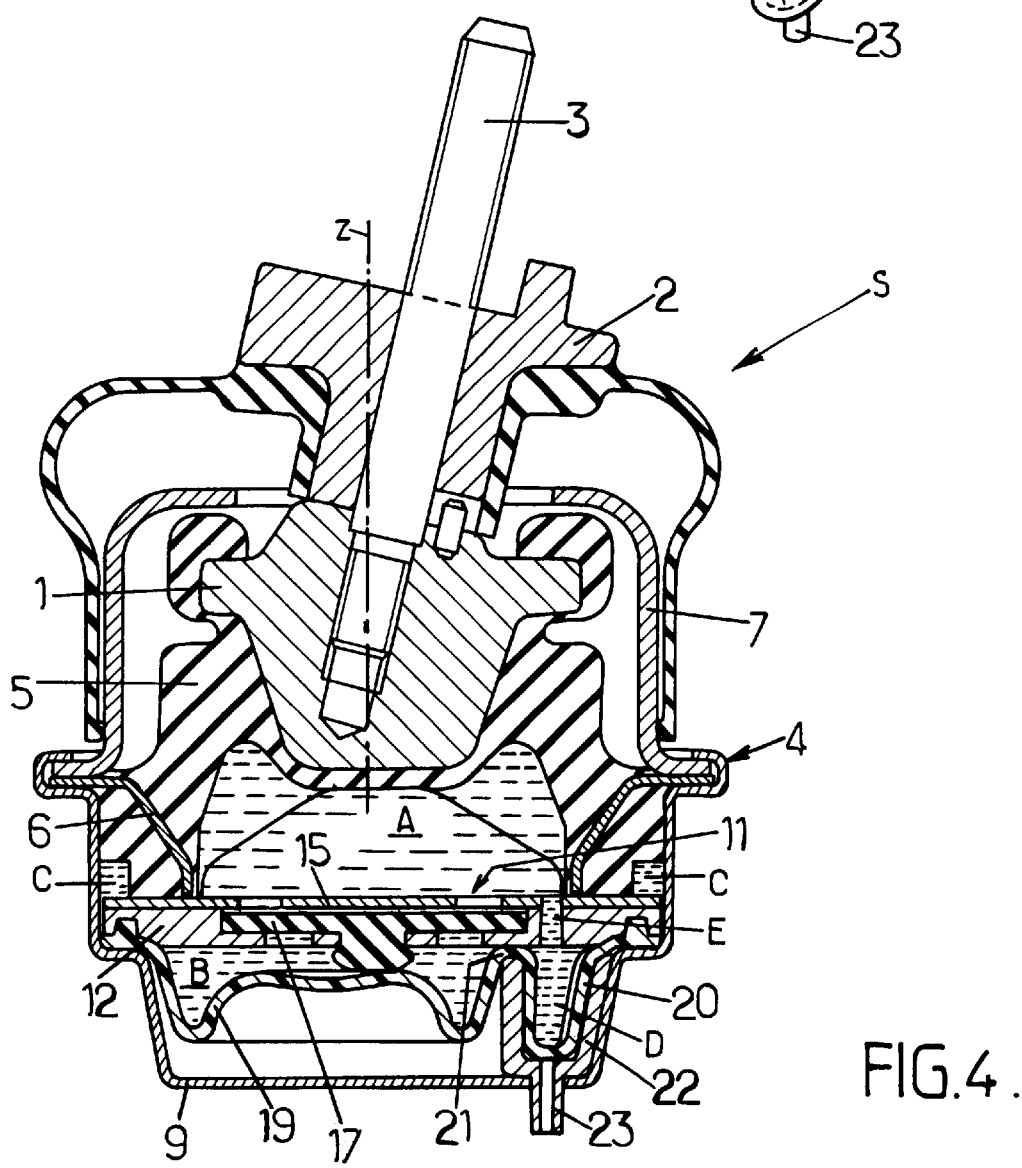

In contrast, when the vehicle is running, i.e. when the engine speed is above said predetermined limit, the control circuit 26 actuates the valve 24 in such a manner that the vacuum chamber P communicates with the suction source 25 so that the flexible bag 20 is held pressed against the inside surface of the thimble 22, as shown in FIG. 4.

In this mode of operation, it is as though the compensation chamber D did not exist, and as a result, the antivibration support operates in conventional manner:

firstly by filtering low amplitude vibration (e.g. of amplitude less than 0.5 mm or 1 mm) at relatively high frequency (e.g. greater than 20 Hz) by means of the valve member 17; and secondly by damping low frequency vibration (e.g. below 20 Hz) of large amplitude (e.g. greater than 1 mm) by transferring liquid between the working chamber A and the compensation chamber B via the constricted passage C.

I claim:

1. A hydraulic antivibration support for interposing between two rigid elements and comprising:

first and second rigid strength members for fixing to the two rigid elements that are to be united;

an elastomer body interconnecting the two strength members and defining part of a liquid-filled working chamber, said elastomer body being adapted to support a static load directed along a central axis;

a flexible elastomer wall forming two adjacent bags which define respectively a compensation chamber and an additional hydraulic chamber, both filled with liquid and connected to the working chamber respectively via a constricted first passage and via a second passage;

a rigid partition extending perpendicularly to the central axis and secured to the second strength member, said rigid partition separating the working chamber from the compensation chamber and from the additional hydraulic chamber;

a rigid protective cup covering the flexible wall and encompassing both the compensation chamber and the additional hydraulic chamber, said protective cup having an end wall and a peripheral side wall fixed to the second strength member; and a rigid thimble which has an annular side wall extending in the direction of the central axis between a closed end wall and an open end, said thimble being pressed against the flexible wall and clamping said flexible wall in leakproof manner against the rigid partition around the second bag formed in said flexible wall so as to separate the compensation chamber from the additional hydraulic chamber, and said thimble presenting an inside surface which co-operates with said second bag to define a pneumatic chamber communicating with a pneumatic duct;

wherein the additional hydraulic chamber is adjacent to the side wall of the protective cup;

wherein the compensation chamber is juxtaposed to said additional hydraulic chamber without surrounding said additional hydraulic chamber, said compensation chamber being in contact with the rigid partition via a first surface area that is more than four times greater than a second surface area of said rigid partition which is in contact with the additional hydraulic chamber; and wherein the thimble extends parallel to the central axis to the end wall of the protective cup, the second bag of the flexible wall extending at rest to the vicinity of the end wall of said thimble.

2. An antivibration support according to claim 1, in which the rigid partition has a central portion provided with a decoupling valve member formed by a flexible elastomer membrane which separates the working chamber from the compensation chamber and which is adapted to vibrate within limited clearance between these two chambers, the second passage being disposed radially outside said decoupling valve member, and the compensation chamber being disposed substantially to correspond with the decoupling valve member.

3. An antivibration support according to claim 2, in which the rigid partition has two grids communicating respectively with the working chamber and with the compensation chamber to limit the clearance for the decoupling valve member, the free end of the thimble being placed radially outside the grid which communicates with the compensation chamber, placing a solid portion of said rigid partition.

4. An antivibration support according to claim 1, in which the second passage is a constricted passage, said first and second throttle passages being dimensioned to present different first and second resonant frequencies respectively, the first resonant frequency being less than 20 Hz and the second resonant frequency lying in the range 20 Hz to 80 Hz.

5. An antivibration support according to claim 1, in which the flexible elastomer wall has a peripheral edge which is clamped in leakproof manner between the side wall of the protective cup and the rigid partition, the open end of the side wall of the thimble being shaped substantially as a segment of a circle and presenting firstly a curved portion running along the side wall of the protective cup, and secondly a substantially rectilinear portion between the compensation chamber and the additional hydraulic chamber.

6. An antivibration support according to claim 1, in which the second passage extends substantially parallel to the central axis.

7. A motor vehicle including:
bodywork supporting an engine via at least one hydraulic antivibration support according to claim 1;
a three-port valve mounted in the vehicle independently of the antivibration support and adapted to make the pneumatic chamber of the antivibration support communicate either with the atmosphere or with a source of suction; and
a control device mounted in the vehicle independently of the antivibration support and adapted to actuate the three-port valve so as to make the pneumatic chamber of the antivibration support communicate with the atmosphere when the engine of the vehicle is operating at a speed below a predetermined limit, and so as to make the pneumatic chamber of the antivibration support communicate with the source of suction when the vehicle engine is operating at a speed greater than said redetermined limit.

8. A vehicle according to claim 7, in which said predetermined limit corresponds to an engine speed that generates vibration at a frequency that lies in the range 20 Hz to 100 Hz, and that is not less than said resonant second frequency.

* * * * *

UNITED STATES PATENT AND TRADEMARK OFFICE
CERTIFICATE OF CORRECTION

PATENT NO. : 6,386,527 B2
DATED : May 14, 2002
INVENTOR(S) : Alexandre Oberle

It is certified that error appears in the above-identified patent and that said Letters Patent is hereby corrected as shown below:

Column 8,
Line 28, please delete "redetermined" and insert -- predetermined -- in its place.

Signed and Sealed this

Twentieth Day of August, 2002

Attest:

JAMES E. ROGAN
Attesting Officer    Director of the United States Patent and Trademark Office